March 7, 1939.  H. BOX  2,149,665
FASTENER
Filed May 10, 1937
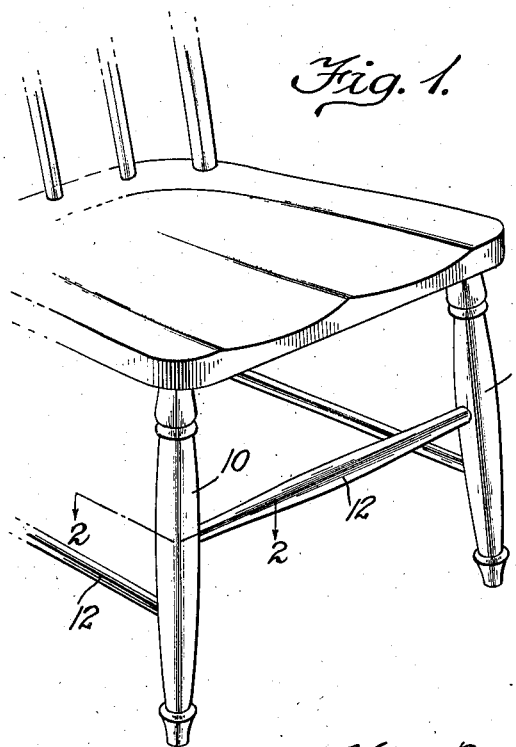
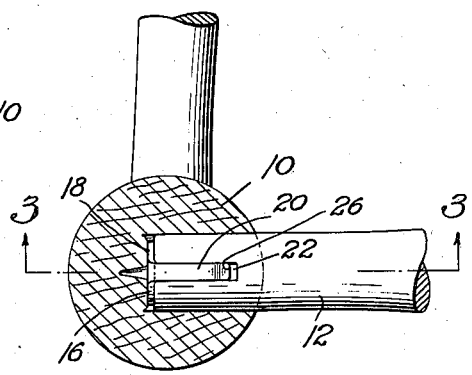
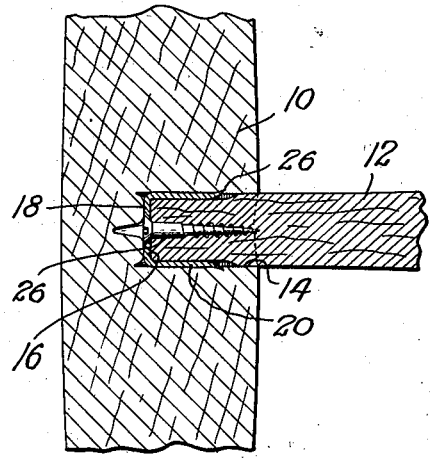
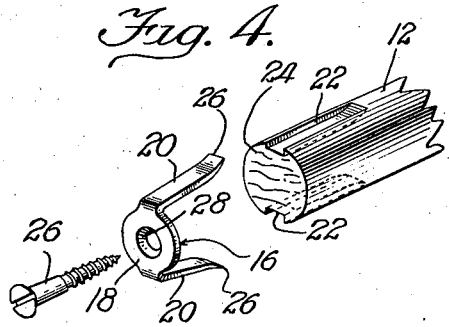
Harry Box.
INVENTOR
BY Victor J. Evans & Co.
HIS ATTORNEYS Patented Mar. 7, 1939

2,149,665

UNITED STATES PATENT OFFICE 2,149,665

FASTENER

Harry Box, Cedar Rapids, Iowa

Application May 10, 1937, Serial No. 141,803

1 Claim. (Cl. 20—92)

My invention relates to furniture and includes among its objects and advantages the provision of an improved fastener for joint structures.

In the accompanying drawing:

Fig. 1 is a perspective view of a portion of a chair in which the invention is incorporated;

Fig. 2 is a sectional view along the line 2—2 of Fig. 1;

Fig. 3 is a sectional view along the line 3—3 of Fig. 2; and

Fig. 4 is a perspective view of the fastener showing the parts separated for the sake of clearness.

In the embodiment selected to illustrate my invention I make use of an item of furniture, such as a chair, which is made up of parts permanently connected as the legs 10 and the rungs 12. Figs. 2 and 3 illustrate the leg 10 as being bored at 14 for the reception of one end of the rung 12. The rung 12 is of such diameter with respect to the bore 14 as to fit snugly therein when driven home.

In Fig. 4, the fastening element 16 includes a plate 18 and prongs 20 arranged substantially at right angles to the plate. Rung 12 is grooved at 22 for receiving the prongs 20, and the plate 18 is positioned adjacent the end 24 of the rung. A wood screw 26 is passed through the opening 28 in the plate 18 and is anchored in the rung, as illustrated in Fig. 3.

According to Fig. 4, the prongs 20 are arranged at a slight angle to the longitudinal axis of the rung 12 so that the ends 26 will project beyond the contour of the rung when the unit 16 is attached thereto. The ends 26 are bent outwardly slightly and sharpened.

After the element 16 has been attached to the rung, the rung is driven into the bore 14 to the position illustrated in Fig. 3. As the rung is being driven home, the prongs 20 are flexed inwardly of the grooves 22, and the tension of the prongs is such as to urge the sharpened ends 20 into the wall of the bore to resist outward movement of the rung. Because of the holding relation between the element 16 and the wall of the bore 14, the rung will be effectively anchored.

The joint may or may not be glued. Grooves 22 are narrow so as to retain a relatively large pressure relation between the rung and the bore 14. The prongs 20 hold the rung and the leg in connected relation. Because of the specific formation of the ends 20, the rung may be easily driven into the bore, but the sharp ends tend to cut into the wall for establishing a permanent connection.

Without further elaboration, the foregoing will so fully explain my invention that others may, by applying current knowledge, readily adapt the same for use under various conditions of service.

I claim:

In a furniture construction, a first member having a bore, a second member having an end reach fitting inside said bore, said end reach having longitudinal grooves intersecting the end face of the reach, a fastener including a plate extending across the end face of said end reach and having flexible prongs lying within said grooves, said flexible prongs normally diverging toward their outer ends, and means for securing said plate to said face, said prongs having ends shaped to extend beyond the diameter of said end reach, to be anchored in the wall of said bore, the wall of said bore flexing the prongs inwardly of said grooves.

HARRY BOX.